No. 888,347. PATENTED MAY 19, 1908.
M. M. McINTYRE.
VEHICLE SPRING.
APPLICATION FILED JUNE 2, 1906.

Witnesses:
A. L. Lord.
G. H. Myers.

Inventor,
Michael M. McIntyre.
By Bates, Fouts & Hull
Attorneys.

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

No. 888,347.    Specification of Letters Patent.    Patented May 19, 1908.

Application filed June 2, 1906. Serial No. 319,814.

*To all whom it may concern:*

Be it known that I, MICHAEL M. MCINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

My invention relates to vehicle springs, and has for its object to provide a spring composed of two or more individual members and to so unite, construct, and support said members as to permit easy and free relative movement of the ends of the spring members as well as bodily longitudinal movement of the said members relatively to their support without impairing the physical properties of said members.

Generally speaking, the invention may be defined as consisting of the combinations of elements, for the purpose specified, embodied in the claims hereto annexed.

Figure 1:
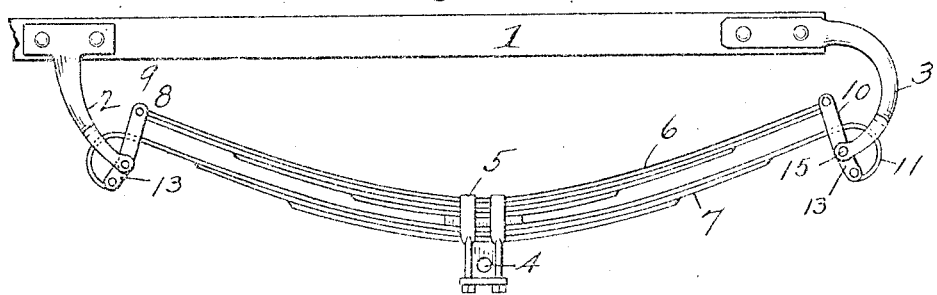
Figure 2:
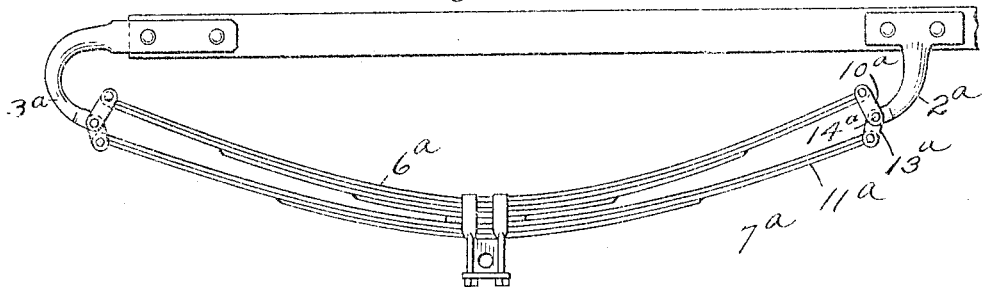
Figures 3, 4:
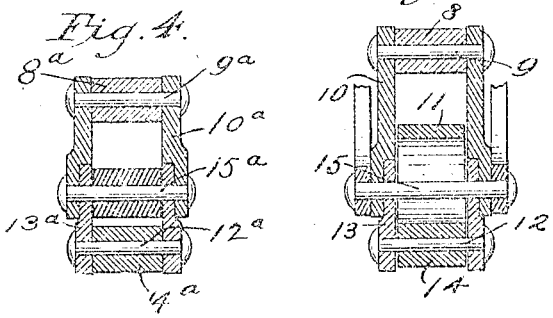

In the accompanying drawings, Figure 1 represents a side elevation of one form of spring constructed in accordance with my invention; Fig. 2 is a similar view of a modification of the form of spring shown in the preceding figure; Fig. 3 is a longitudinal sectional view through the links or shackles of Fig. 1, and Fig. 4 is a similar view through the links or shackles of Fig. 2.

Describing the parts by reference characters, 1 represents a portion of the frame of a vehicle having supports 2 and 3 for the ends of the springs. In the embodiment herein disclosed, the supports 2 and 3 are the outriders or hangers of an automobile.

4 denotes the axle of the vehicle to which are secured, as by clips 5, the spring members 6 and 7, the former of which I will designate as the "carrier" spring member, and the latter as the "passenger" or "load" spring member. These spring members are so constructed and designed that the member 6 carries the greater proportion of the weight of the unloaded vehicle, and the member 7 a relatively smaller proportion of such weight, as fully set forth and explained in my application No. 247,286, filed Feb. 25th, 1905.

In Fig. 1, the upper or "carrier" spring member is provided at each end with an eye 8 embracing a pin 9 carried by a shackle comprising the double links 10, the lower ends of which are pivotally connected to an outrider or hanger 2 or 3.

The lower or "passenger" spring member is provided with long flexible ends terminating in scrolls 11, the ends of which are within or toward the axle with respect to the bodies of the scrolls and are connected to the pins 12 of shackles comprising the side links 13, by eyes 14. The upper ends of the links 13 may be pivoted to the bolt or pin 15 which is carried by one of the hangers 2 or 3 and supports the lower ends of the shackle links 10. As will appear from Fig. 1, which represents the positions of the parts with no load on the vehicle, the lower ends of the short shackles or links 13 are slightly outside of vertical lines extending downwardly from the pins or bolts 15. Under load, the lower ends of the scrolls move inwardly until the lower ends of the links or shackles are substantially in a vertical line drawn from the pivot pin or bolt 15, as described in my application No. 314,805, filed May 2nd, 1906. Meanwhile, the elongation of the spring member 6 under load will move the upper ends of the shackles comprising the links 10 into the same vertical line with the pin 15 and lower end of scroll 11, as shown and explained in my application aforesaid.

The construction above described is particularly useful in conjunction with vehicles having short hangers or outriders, as the connecting of the scroll spring member to a link or shackle depending from the hanger enables the scroll to expand and contract vertically under conditions of use without being obstructed by the frame of the vehicle. At the same time, the ends of the spring members are free to move relatively to each other, and the axle may move bodily backward and forward under the influence of a radius rod without injury to the spring ends.

In Fig. 2, the same results are accomplished by the use of two semi-elliptic spring members, the upper member 6ª of which is substantially identical in construction with the upper member 6 of the spring shown in Fig. 1, and has its ends provided with eyes 8ª embracing pins 9ª of links or shackles 10ª, supported from the hangers 2ª, 3ª, by pins 15ª, in the same manner as the correspondingly numbered parts in Fig. 1. As the lower spring member in this case has no scrolls extending through the links or shackles 10, said links or shackles may be shorter than those shown in Fig. 1.

The lower spring member 7ª is a semi-elliptic spring, but the ends 11ª thereof are more flexible than the ends of spring member 6ª, and the spring is designed to operate, in the matter of supporting the load and vehicle, in the same general manner as spring member 7. The ends of 7ª are connected to links or shackles 13ª depending from the hangers 2ª, 3ª, by eyes 14ª, embracing pins 12ª, and the springs and links are so proportioned that the links will be in a substantially vertical line with their point of connection with the hanger when the spring members are deflected under maximum load. Shackles 13 and 13ª may be provided with any means for preventing them from capsizing under the rebound of the vehicle.

Having described my invention, I claim:

1. The combination, with the hangers or outriders of a vehicle, of an upper and a lower spring member clamped together to form a unitary structure, links or shackles extending upwardly from said hangers or outriders and connected to the ends of the upper spring member, and links or shackles extending downwardly from said hangers or outriders, the lower spring member terminating in scrolls, the ends of which are connected to the last mentioned links or shackles, substantially as specified.

2. The combination, with the hanger or outrider of a vehicle, of an upper semi-elliptic and a lower scroll spring member connected together to form a unitary structure, and a pair of links or shackles pivoted to said hanger or outrider and extending in opposite directions therefrom, one link or shackle being connected with the adjacent end of the upper spring member and the other link or shackle being connected with the adjacent end of the lower spring member, substantially as described.

3. The combination, with the frame and axle of a vehicle, of a pair of spring members supported from said axle, one of said members having scroll ends, hangers carried by said frame, and links or shackles extending in opposite directions from said hangers and connected to said spring members, substantially as specified.

4. The combination, with the frame and axle of a vehicle, of a spring comprising a pair of spring members supported from said axle, one of said members having a scroll end, a hanger carried by said frame, and links or shackles extending in opposite directions from said hanger and connected respectively to the end of the scroll and the corresponding end of the other spring member, substantially as specified.

5. The combination, with the frame and axle of a vehicle, of a pair of spring members supported by said axle, a hanger carried by said frame, and swinging shackles extending in opposite directions from said hanger and connected to the corresponding ends of said spring members, each shackle comprising a pair of links, the links of one of said shackles being pivoted within the links of the other substantially as specified.

6. A double spring for vehicles comprising a pair of spring members connected together at their body portions, one of said members being provided with a scroll end, and a pair of shackles connecting the adjacent ends of said members, said shackles being pivotally connected at a point intermediate of the ends of the spring members and extending in opposite directions from their point of connection to said spring ends, substantially as specified.

7. The combination, with the frame and axle of a vehicle, of a pair of spring members supported by said axle, one of said spring members having scroll ends, and a separate flexible connection extending between each end of each of said members and said frame, the ends proper of the scrolls extending inwardly or toward the axle with respect to the bodies of the scrolls substantially as specified.

In testimony whereof, I hereunto affix my signature in the presence of two witnesses.

MICHAEL M. McINTYRE.

Witnesses:
S. E. FOUTS,
J. B. HULL.